United States Patent
Rawson, III et al.

(10) Patent No.: US 9,501,285 B2
(45) Date of Patent: Nov. 22, 2016

(54) REGISTER ALLOCATION TO THREADS

(75) Inventors: Freeman Leigh Rawson, III, Austin, TX (US); William Evan Speight, Austin, TX (US); Lixin Zhang, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1619 days.

(21) Appl. No.: 12/789,062

(22) Filed: May 27, 2010

(65) Prior Publication Data

US 2011/0296428 A1    Dec. 1, 2011

(51) Int. Cl.
  *G06F 9/50* (2006.01)
  *G06F 9/38* (2006.01)
  *G06F 9/30* (2006.01)

(52) U.S. Cl.
  CPC ......... *G06F 9/3851* (2013.01); *G06F 9/30098* (2013.01); *G06F 9/30123* (2013.01); *G06F 9/30138* (2013.01); *G06F 9/384* (2013.01); *G06F 9/5016* (2013.01)

(58) Field of Classification Search
  None
  See application file for complete search history.

(56) References Cited

U.S. PATENT DOCUMENTS

| | | | |
|---|---|---|---|
| 5,261,062 A * | 11/1993 | Sato | 717/153 |
| 6,092,175 A | 7/2000 | Levy et al. | |
| 6,178,482 B1 | 1/2001 | Sollars | |
| 6,456,891 B1 | 9/2002 | Kranich et al. | |
| 6,954,846 B2 | 10/2005 | Leibholz et al. | |
| 7,275,246 B1 * | 9/2007 | Yates et al. | 718/100 |
| 7,418,582 B1 * | 8/2008 | Iacobovici et al. | 712/228 |
| 7,506,139 B2 | 3/2009 | Burky et al. | |
| 2004/0003208 A1 | 1/2004 | Damron | |
| 2004/0268093 A1 | 12/2004 | Samra et al. | |
| 2005/0022191 A1 * | 1/2005 | Bonaventure et al. | 718/100 |
| 2007/0094483 A1 * | 4/2007 | Wilson et al. | 712/220 |
| 2008/0229076 A1 * | 9/2008 | Gonion | 712/214 |
| 2008/0313437 A1 | 12/2008 | Gschwind | |
| 2009/0327661 A1 | 12/2009 | Sperber et al. | |
| 2010/0161948 A1 * | 6/2010 | Abdallah | 712/228 |

FOREIGN PATENT DOCUMENTS

GB    2190521 A    11/1987

OTHER PUBLICATIONS

Marcuello et al; Exploiting Speculative Thread-Level Parallelism on a SMT processor, Departament d'Arquitectura de Computadors, Universitat Politèecnica de Catalunya, C/ Jordi Girona 1-3, Mòdul D6, Campus Nord 08034 Barcelona (Spain).

(Continued)

*Primary Examiner* — Umut Onat
(74) *Attorney, Agent, or Firm* — Garg Law Firm, PLLC.; Rakesh Garg; William Stock (57) ABSTRACT

A method, system, and computer usable program product for improved register allocation in a simultaneous multi-threaded processor. A determination is made that a thread of an application in the data processing environment needs more physical registers than are available to allocate to the thread. The thread is configured to utilize a logical register that is mapped to a memory register. The thread is executed utilizing the physical registers and the memory registers.

20 Claims, 8 Drawing Sheets

(56) References Cited

OTHER PUBLICATIONS

Lo et al; Software-Directed Register Deallocation for Simultaneous Multithreaded Processors, IEEE Transactions on Parallel and Distributed Systems, vol. 10, 922-933, No. 9, Sep. 1999.
Tran et al; Dynamically Reducing Pressure on the Physical Register File through Simple Register Sharing, International Symposium on Performance Analysis of Systems and Software, 2004.
European Patent office, International Searching Authority, EP2011058078, May 18, 2011.

* cited by examiner

REGISTER ALLOCATION TO THREADS

BACKGROUND OF THE INVENTION

1. Field of the Invention

The present invention relates generally to an improved data processing system, and in particular, to a computer implemented method for improving the performance of applications executing in a data processing system. Still more particularly, the present invention relates to a computer implemented method, system, and computer usable program code for improved register allocation for hardware-enabled threads in simultaneous multithreaded processors.

2. Description of the Related Art

An application executing in a data processing system spawns threads that are executed by a processor in the data processing system. A thread is a thread of execution resulting from a division of a computer program into two or more tasks. The implementation of threads and processes differs from one operating system to another, but in most cases, a thread is contained inside a process associated with the application. Multiple threads can exist within the same process and share resources such as memory.

During execution, a thread has to maintain state information. This state information is called architectural state and is usually stored in registers. A register is space to hold data, such as state of a thread. A register is usually designed and located such that storing data into and reading data from a register is fastest compared to similar operation with other memory locations in a given data processing system.

A physical register is a register constructed in hardware. A logical register is a data structure usable by an application, such as by a thread of an application, in a manner similar to using a register. A logical register is mapped to a physical register. Typically, for storing state information, a thread does not reference a physical register directly. A thread reads or writes the state information in a logical register, and the reading or writing is directed to the correct mapped physical register.

Simultaneous multi-threading (SMT) is a technology that allows multiple threads to execute on a processor unit concurrently. Each thread in SMT architectures still has to maintain its own state using registers. In a data processing system employing SMT technology, multiple threads can have physical registers allocated to them simultaneously for storing their respective state information.

SUMMARY OF THE INVENTION

The illustrative embodiments provide a method, system, and computer usable program product for improved register allocation among threads in a simultaneous multithreaded processor. An embodiment determines that a thread of an application in the data processing environment needs a higher number of physical registers than a second number of physical registers in a set of physical registers that is available to allocate to the thread. The embodiment configures the thread to utilize a logical register that is mapped to a memory register. The embodiment executes the thread.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A multi-threaded application can generally produce higher throughput compared to a single-threaded application performing the same task. Multi-thread design of an application is therefore generally preferred over a single-threaded design.

The invention recognizes that the threads within a multi-threaded application or threads from different applications have differing needs for registers. Some threads may demonstrate improved performance as the number of allocated registers is increased, whereas other threads may deteriorate or not benefit significantly with increased allocation of registers.

The invention recognizes that in a presently available architecture of data processing systems, the number of physical registers available for allocation is fixed. In the present architecture, the number of threads that can be supported, even using SMT technology, is limited by the number of available physical registers.

The invention further recognizes that presently, applications are designed using a logical register file of a fixed size. A logical register file is a data structure used for managing the logical registers. Thus, the application and its threads execute with reference to the fixed number of logical registers.

Mapping of logical registers to physical registers depends on the number of physical registers available for allocation. One data processing system configured in one way may have a larger number of physical registers available for allocation and mapping as compared to another data processing system configured another way. However, the invention recognizes that because presently the number of logical registers, and thereby the number of physical registers they map to at any instant, is also fixed, an application cannot utilize the larger number of physical registers, even though they may be available for allocation.

SMT does allow multiple threads to be executed concurrently. However, the invention recognizes that significant amount of hardware is needed to maintain the registers in SMT architectures. Even with the existing approaches for the maintenance of the registers in SMT, the number of threads remains limited by the number of physical registers.

The illustrative embodiments used to describe the invention generally address and solve the above-described problems and other problems related to allocating registers in a multi-threaded data processing environment. The illustrative embodiments of the invention provide a method, computer usable program product, and data processing system for improved register allocation to threads in a multi-threaded environment.

The illustrative embodiments are described with respect to data, data structures, and identifiers only as examples. Such descriptions are not intended to be limiting on the invention. For example, an illustrative embodiment described with respect to one type of data structure may be implemented using a different type of data structure in a different configuration, in a similar manner within the scope of the invention.

Furthermore, the illustrative embodiments may be implemented with respect to any type of data processing system. For example, an illustrative embodiment described with respect to a single processor may be implemented in a multiprocessor system or a multi-core processor system within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to one type of memory may be implemented using another type, size, and arrangement of a data storage device or area, in a similar manner within the scope of the invention.

An application implementing an embodiment may take the form of data objects, code objects, encapsulated instructions, application fragments, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
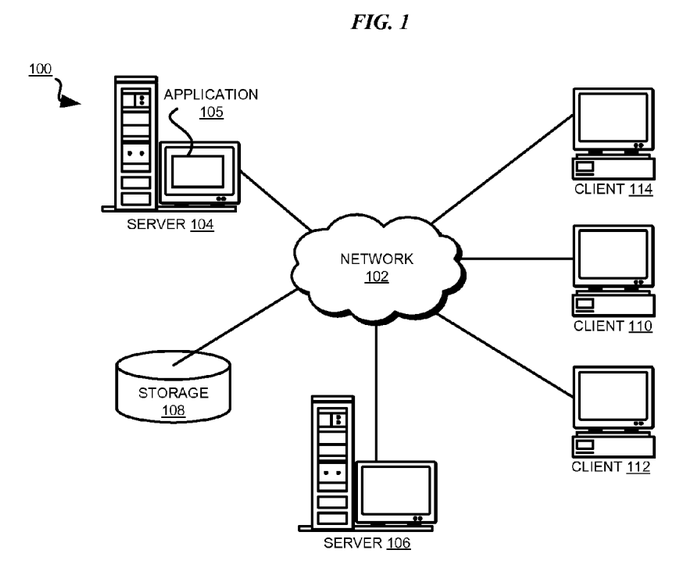
FIG. 1 depicts a pictorial representation of a network of data processing systems in which the illustrative embodiments may be implemented.
Figure 2:
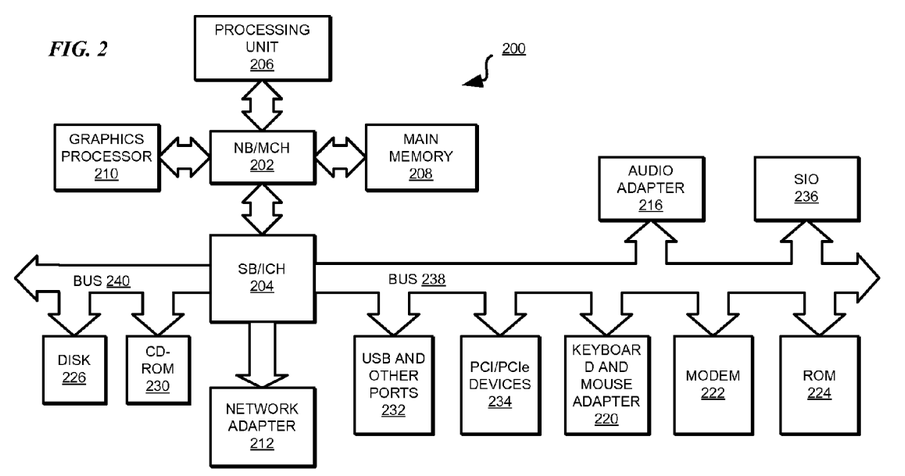
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include application 105. Application 105 may be a multi-threaded application executing in server 104. In a different configuration, application 105 may be an implementation of an embodiment of the invention described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more homogeneous or heterogeneous processor systems. Processing unit 206 may be a multi-core processor. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
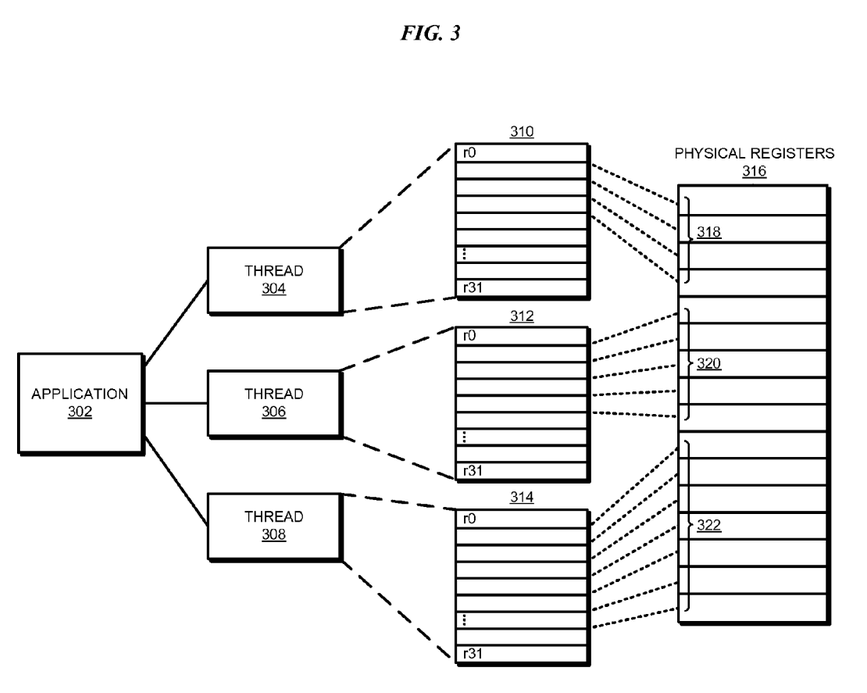
FIG. 3 depicts a block diagram of an example register allocation in a multi-threading configuration with respect to which an illustrative embodiment may be implemented.

With reference to FIG. 3, this figure depicts a block diagram of an example register allocation in a multi-threading configuration with respect to which an illustrative embodiment may be implemented. Application 302 may be a multi-threaded application similar to application 105 in FIG. 1. Threads 304, 306, and 308 may be example subset of threads spawned by application 302 at a given time. A set of threads is one or more threads.

Each thread 304, 306, and 308 has access to a fixed set of logical registers on a per-thread division. Thread 304 has access to logical registers 310. Thread 306 has access to logical registers 312. Thread 308 has access to logical registers 314. Logical registers 310, 312, and 314 each have a fixed number of logical registers, such as for example, thirty-two logical registers each labeled sequentially "r0" through "r31".

Physical registers 316 may be a set of physical registers to which logical registers 310, 312, and 314 may be mapped. A set of logical or physical registers is one or more logical or physical registers. Each logical register may not be mapped to a physical register, such as when more logical registers are configured than the number of available physical registers.

Thread 304 is allowed to access all of logical registers 310 as depicted. Logical registers 310 may be mapped to subset 318 of physical registers 316. Accordingly, thread 304 may read and write using some or all of the physical registers in subset 318 according to a given register mapping.

Similarly, thread 306 is allowed to allocate all of logical registers 312 as depicted. Logical registers 312 may be mapped to a subset 320 of physical registers 316. Accordingly, thread 306 may read and write using some or all of the physical registers in subset 320 according to a given mapping.

Similarly, thread 308 is allowed to allocate all of logical registers 314 as depicted. Logical registers 314 may be mapped to a subset 322 of physical registers 316. Accordingly, thread 308 may read and write using some or all of the physical registers in subset 322 according to a given mapping.

The invention recognizes that presently physical register space may go unused due to the static nature of the mapping between logical and physical registers in architectures that do not include register renaming. The invention recognizes this waste of computing resource and provides an embodiment to re-allocate the unused registers, or transfer the transferable registers, elsewhere in this disclosure.

Figure 4:
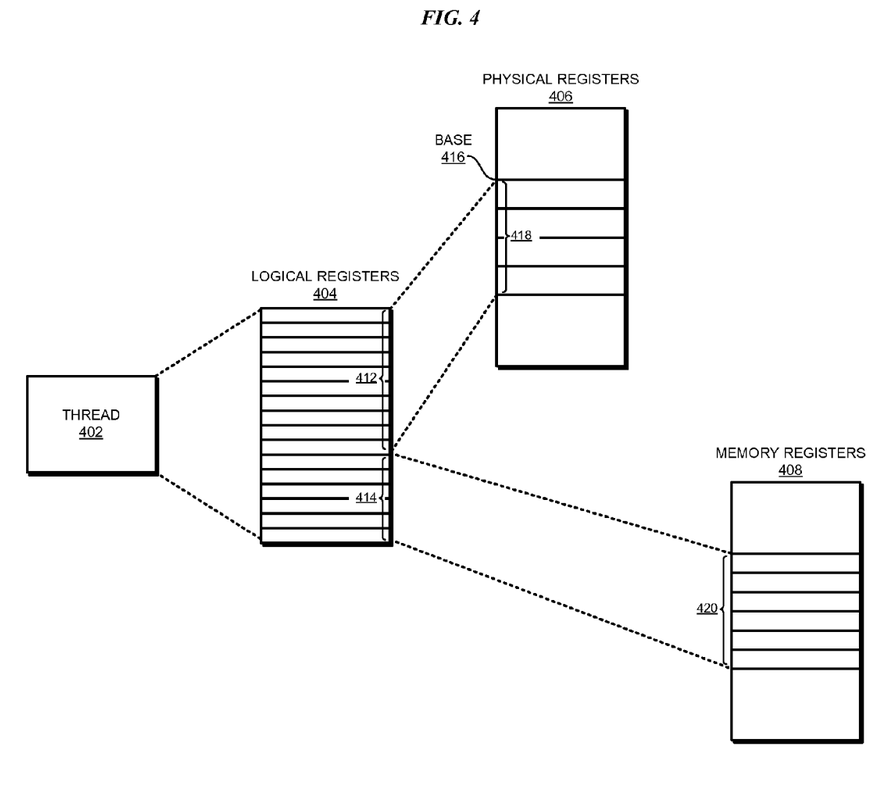
FIG. 4 depicts a block diagram of an improved register allocation in a multi-threading configuration in accordance with an illustrative embodiment.

With reference to FIG. 4, this figure depicts a block diagram of an improved register allocation in a multi-threading configuration in accordance with an illustrative embodiment. Thread 402 may be similar to any of threads 304, 306, and 308 in FIG. 3. Logical registers 404 may be implemented using logical registers 310 in FIG. 3, further including certain modifications according to an embodiment of the invention. Physical registers 406 may be implemented using physical registers 316 in FIG. 3 with additional structures to maintain base and bound information.

According to an embodiment of the invention, a subset of registers is identifiable by the subset's "base and bound". A base is the address, location, or another identifier of the first register in the subset. A bound is a count or another measure of the number of registers in the subset measured from and including the base register. For example, a subset of thirty-two physical registers starting at address 0ABC1230 may be identified by base 0ABC1230 and bound 32.

Using present methods of register allocation to threads, under certain circumstances, a thread may not be allocated a number of registers according to the thread's desired configuration. This shortage of allocation may occur due to insufficient number of physical or logical registers available in the given configuration. For example, even if the thread can use a large number of logical registers efficiently, the thread only has access to a fixed number of logical registers, and all logical registers may not be backed by physical registers. When the unmapped logical registers are accessed, they cause a register spill, which is a costly operation in current microarchitectures.

According to an embodiment of the invention, all physical registers are made available to all active threads and the number of logical registers may also vary between threads according to their needs. An active thread is a thread that is executing. Furthermore, the number of physical registers allocated to a thread can be dynamically adjusted, to wit, increased or decreased during the thread's execution, according to an embodiment.

According to another embodiment, a logical register not backed up by a physical register is mapped to a memory location. In other words, a region of memory may act as a physical register to which a logical register may be mapped in order to increase the number of logical registers available to a thread. A region of memory acting as a physical register to which a logical register may be mapped is herein called a memory register. When a logical register mapped to a memory register is used by a thread, the register access is converted to a corresponding memory access.

Memory registers 408 is a set of memory registers. A set of memory registers is one or more memory register. As an example, thread 402 has access to the entire set of logical registers 404, however, only portion 412 is depicted as mapped to a subset of physical registers with base 416 and bound 418. Set 404 of logical registers is depicted as not being backed entirely by physical registers with base 416 and bound 418.

Remaining logical registers allocated to thread 402—subset 414, is mapped to subset 420 of memory registers according to an embodiment. Mapped in this manner, advantageously, thread 402 is able to execute with the desired number of registers even when sufficient number of physical registers are unavailable for backing each logical register allocated to thread 402.

In one embodiment, an area of a cache associated with a processor, such as a level 1 cache or a level 2 cache, may be utilized for creating memory registers 408. However, this example location of memory registers 408 is not intended to be limiting on the invention. Memory registers 408 may be created using any suitable data storage device or structure within the scope of the invention.

Figure 5:
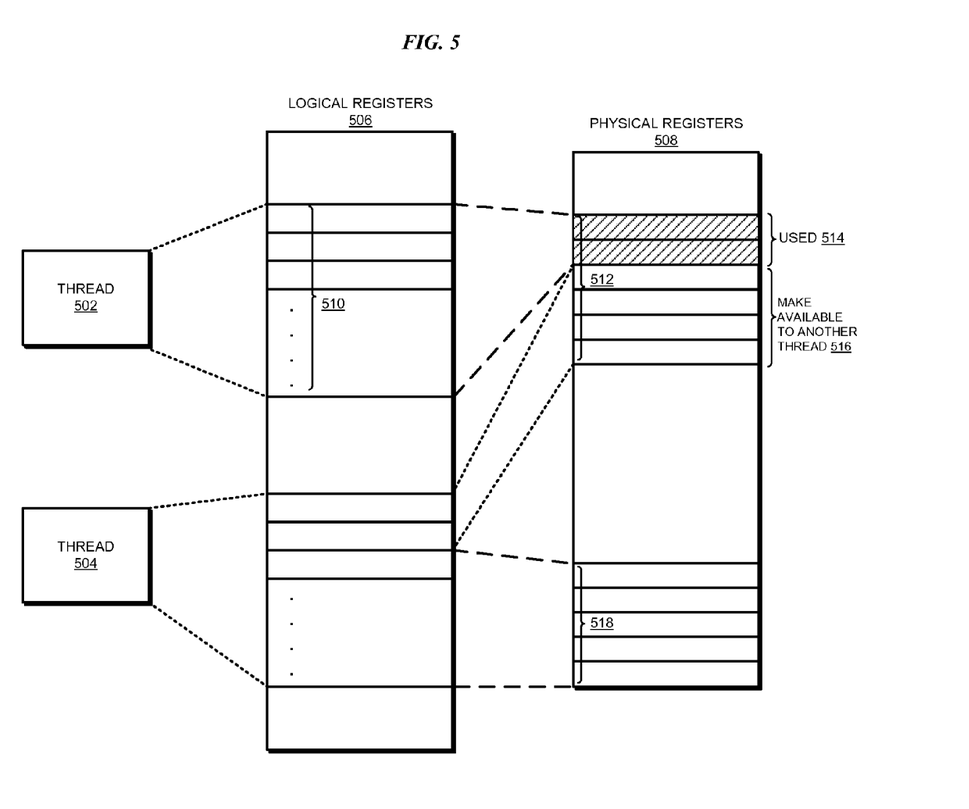
FIG. 5 depicts a block diagram of another improved register allocation in a multi-threading configuration in accordance with an illustrative embodiment.

With reference to FIG. 5, this figure depicts a block diagram of another improved register allocation in a multi-threading configuration in accordance with an illustrative embodiment. Threads 502 and 504 may each be similar to any of threads 304, 306, and 308 in FIG. 3, or thread 402 in FIG. 4. Logical registers 506 may be implemented using logical registers 404 in FIG. 4.

Physical registers 508 may be implemented using physical registers 406 in FIG. 4. In one embodiment, physical registers 508 may be implemented using a combination of physical registers 406 and memory registers 408 in FIG. 4.

Initially, some logical registers 510 available to thread 502 may be mapped to physical registers 512, which may be a subset of physical registers 508. During execution an application, such as a register management component of an operating system implementing an embodiment, as in application 105 in FIG. 1, may determine that thread 502 is using only registers 514 and not fully utilizing all physical registers in subset 512. For example, thread 502 may not be utilizing subset 516 of physical registers 508. The application may also recognize that another thread, such as thread 504, may be able to use more physical registers than subset 518 currently allocated to that thread.

An embodiment may transfer, trade, re-allocate, or otherwise make available physical registers 516 from thread 502 to thread 504 if such availability is deemed advantageous to thread 504 without adversely affecting thread 502. Thread 502's performance remains unaffected from such re-allocation because thread 502 was not utilizing physical registers 516 prior to the re-allocation. The performance of thread 504, on the other hand, may improve due to the re-allocation according to the embodiment because thread 504 can now utilize physical registers subsets 518 as well as 516.

Re-allocation of registers according to an embodiment may occur any number of times during the execution of relevant threads. For example, an embodiment may allocate some physical registers away from thread 502 and provide to thread 504 during one portion of thread 502's execution. The embodiment may re-allocate some physical registers away from another thread, not necessarily from thread 504, and provide to thread 502 during another portion of thread 502's execution.

Figure 6:
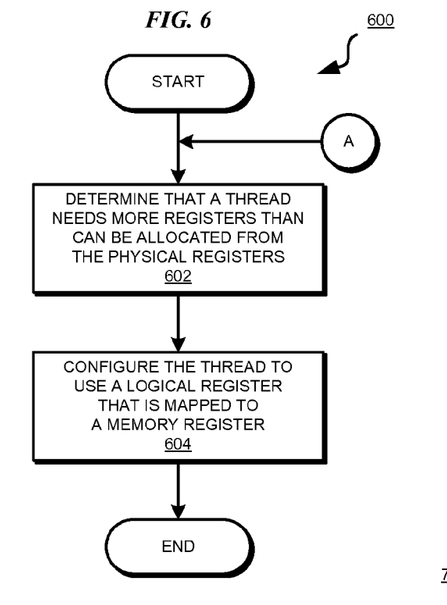
FIG. 6 depicts a flowchart of an example process for improved register allocation to threads in accordance with an illustrative embodiment.

With reference to FIG. 6, this figure depicts a flowchart of an example process for improved register allocation to threads in accordance with an illustrative embodiment. Process 600 may be implemented in one embodiment of application 105 in FIG. 1.

Process 600 begins by determining that a thread needs a number of registers than is more than can be mapped to or allocated from the available physical registers (step 602). Another process may enter process 600 at the entry point marked "A".

Process 600 configures the thread to use a logical register that is mapped to a memory register (step 604). Process 600 may end thereafter or continue monitoring the thread execution for similar circumstances.

In step 604, process 600 may configure the thread to use logical registers some of which are mapped to physical registers and some to memory registers. An embodiment may also allow a thread to utilize logical registers such that all of those logical registers may be mapped to physical registers or all mapped to memory registers.

Figure 7:
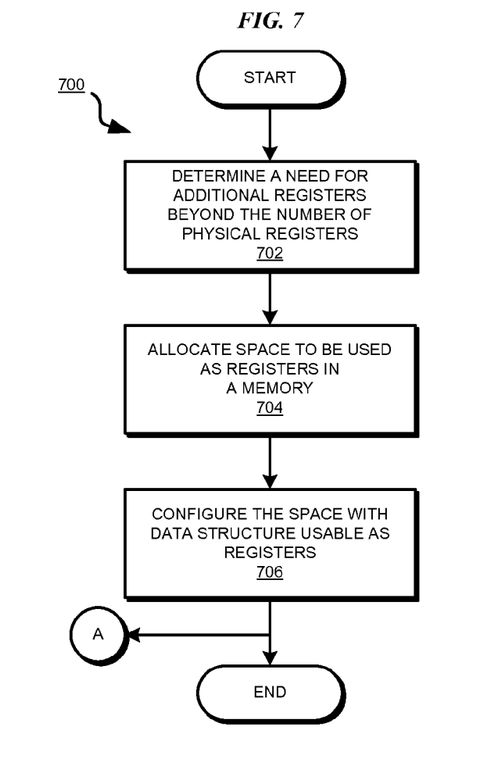
FIG. 7 depicts a flowchart of another example process for improved register allocation to threads in accordance with an illustrative embodiment.

With reference to FIG. 7, this figure depicts a flowchart of another example process for improved register allocation to threads in accordance with an illustrative embodiment. Process 700 may be implemented in one embodiment of application 105 in FIG. 1.

Process 700 begins by determining a need for additional registers beyond the number of physical registers that may be available for allocation (step 702). Process 700 allocates a space in a memory to be used as registers (step 704). Process 700 configures the space with one or more data structures usable as one or more memory registers (step 706). Process 700 may end thereafter, or exit at exit point marked "A" to enter another process having a corresponding entry point marked "A".

The space in step 704 may be allocated in any suitable memory location, device or structure without limitation. The data structure in step 706 may be, for example, an address table holding addresses of each memory register created in the space. Other data structures for similar purpose will be conceivable to those of ordinary skill in the art from this disclosure and the same are contemplated within the scope of the invention.

Figure 8:
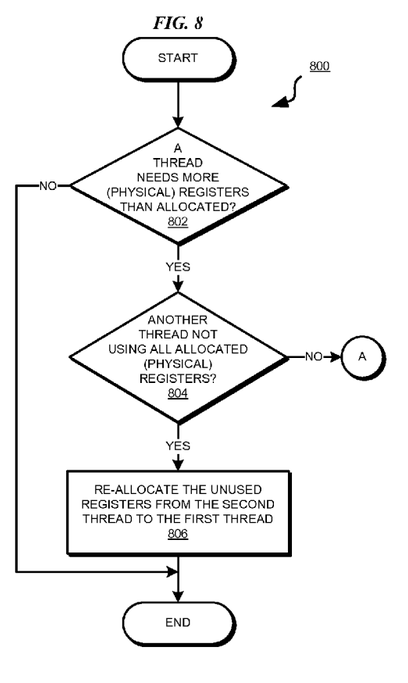
FIG. 8 depicts a flowchart of another example process for improved register allocation to threads in accordance with an illustrative embodiment.

With reference to FIG. 8, this figure depicts a flowchart of another example process for improved register allocation to threads in accordance with an illustrative embodiment. Process 800 may be implemented in one embodiment of application 105 in FIG. 1.

Process 800 begins by determining whether a thread needs more (physical) registers than are currently allocated to the thread (step 802). If no such need exists ("No" path of step 802), process 800 ends thereafter.

If a thread exhibits such a need ("Yes" path of step 802), process 800 determines whether another thread currently executing is not utilizing all allocated (physical) registers or there are unallocated physical registers (step 804). If no currently executing thread is utilizing less than the number of registers allocated to the thread and there are no unallocated physical registers ("No" path of step 804), process 800 exits at exit point marked "A" to enter another process having a corresponding entry point marked "A".

If a currently executing thread is under-utilizing the allocated number of registers or there are unallocated physical registers ("Yes" path of step 804), process 800 re-allocates some or all of the unused or transferable registers from such a thread to the thread needing the registers (step 806). The underutilized allocated registers are the transferable registers. Process 800 may end thereafter or continue monitoring such needs during thread execution by returning to step 802 (not shown).

Figure 9:
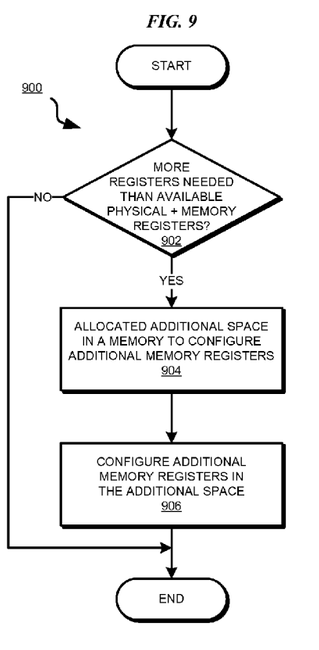
FIG. 9 depicts a flowchart of another example process for improved register allocation to threads in accordance with an illustrative embodiment.

With reference to FIG. 9, this figure depicts a flowchart of another example process for improved register allocation to threads in accordance with an illustrative embodiment. Process 900 may be implemented in one embodiment of application 105 in FIG. 1.

Process 900 begins by determining whether more registers than the available physical and already configured memory registers are needed for the desirable execution of threads currently executing or scheduled for execution in a given period (step 902). If no such need is determined ("No" path of step 902), process 900 may end or return to step 902 for continuing similar monitoring.

If process 900 determines that more registers are needed ("Yes" path of step 902), process 900 allocated additional space in a memory to configure additional memory registers (step 904). The memory used for step 904 may be the same or different from the memory used for the existing memory registers.

Process 900 configures additional memory registers in the additional space (step 906). Process 900 may end thereafter or continue monitoring for similar needs.

Before ending, process 900 may allocate the additional memory registers to the currently executing threads (not shown). In one embodiment, process 900 or another process (not shown) may assess continuing need for memory registers. In response to a decreased demand for registers, the process may release some or all of the memory space used as memory registers. If only some of the memory space is released, the process may re-distribute the remaining memory registers according to the existing needs of the various threads then executing.

Figure 10:
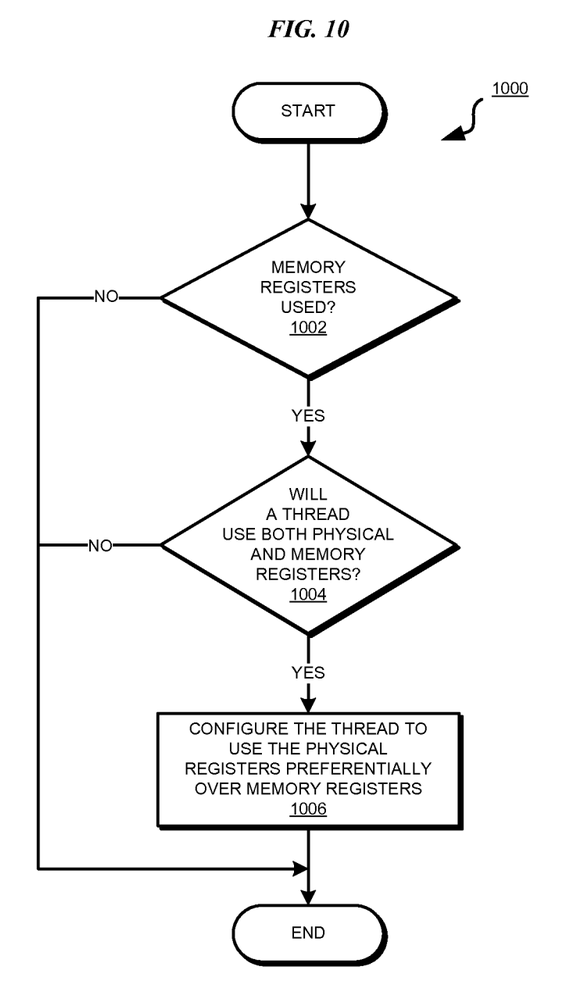
FIG. 10 depicts a flowchart of another example process for improved register allocation to threads in accordance with an illustrative embodiment.

With reference to FIG. 10, this figure depicts a flowchart of another example process for improved register allocation to threads in accordance with an illustrative embodiment. Process 1000 may be implemented in one embodiment of application 105 in FIG. 1, such as in a compiler for pre-compiling code or just-in-time (JIT) compilation of code, or in an application that performs binary translation.

Process 1000 begins by determining whether any memory registers are being used in a multi-threaded environment (step 1002). If memory registers are not in use ("No" path of step 1002), process 1000 ends thereafter.

If memory registers are being used ("Yes" path of step 1002), process 1000 determines whether a thread will use both physical and memory registers (step 1004). If no thread will use memory registers ("No" path of step 1004), process 1000 ends thereafter.

If a thread will use memory registers ("Yes" path of step 1004), process 1000 may configure the thread to use the physical registers preferentially over the memory registers (step 1006). Process 1000 ends thereafter.

In one embodiment, an unused (transferable) and/or unallocated physical register can be used to replace a memory registers of a thread. For example, if a thread is using a memory register and an unallocated physical register or allocated but unused physical register can be made available to the thread, the thread can get the unallocated or allocated but unused physical register and release the memory register.

Figure 11:
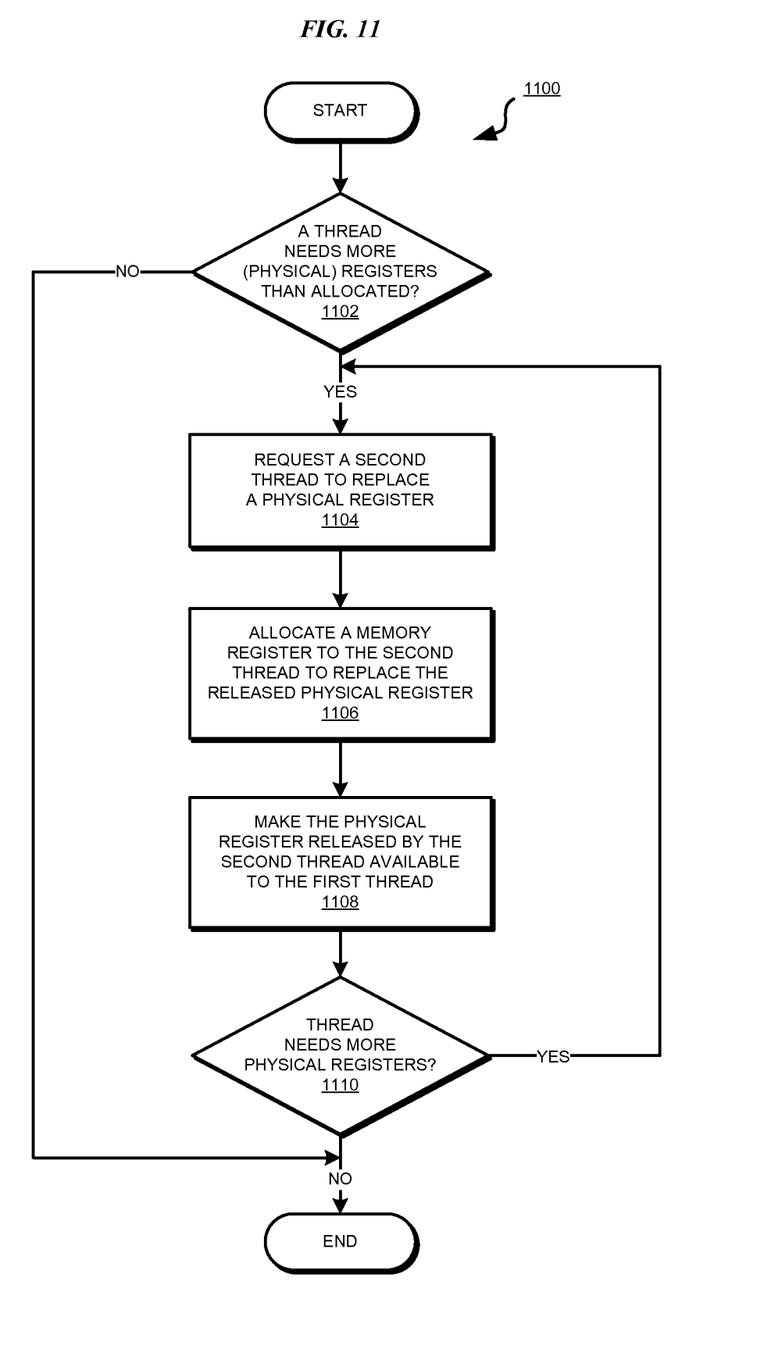
FIG. 11 depicts a flowchart of another example process for improved register allocation to threads in accordance with an illustrative embodiment.

With reference to FIG. 11, this figure depicts a flowchart of another example process for improved register allocation to threads in accordance with an illustrative embodiment. Process 1100 may be implemented in one embodiment of application 105 in FIG. 1.

Process 1100 begins by determining whether a thread needs more physical registers than are allocated to that thread (step 1102). If the thread does not need more physical registers ("No" path of step 1102), process 1100 ends thereafter.

If the thread needs more physical registers ("Yes" path of step 1102), process 1100 requests a second thread to release a physical thread (step 1104). For example, the second thread may not be utilizing a physical register allocated to the second thread and the second thread may be able to release that physical register without adversely affecting second thread's performance.

Process 1100 may optionally allocate a memory register to the second thread to replace the physical register that the second thread releases (step 1106). By such a replacement, should the second thread need an additional register later in the operation, the performance of the second thread will not be as greatly impacted by using the substitute memory register as would have been if the physical register released in response to step 1104 were not replaced by the memory register.

Process 1100 makes the released physical register available to the first thread (step 1108). Process 1100 determines whether the thread requires additional physical registers (step 1110).

If the thread requires additional physical registers ("Yes" path of step 1110), process 1100 may ask the same second thread or a different second thread to release according to step 1104. If the thread does not require any more physical registers ("No" path of step 1110), process 1100 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for improved register allocation to threads in a multi-threading environment. An embodiment of the invention may allow a thread to use all available physical registers in a given environment and may also dynamically provide a different number of logical registers to each thread in an application according to that thread's needs.

An embodiment may allow more threads to be supported with a fixed register file size as compared to the number of threads that can be supported with the same register file size using currently available methods of register allocation. An embodiment may make flexibly sized register sets available to a thread during the thread's execution.

An embodiment may use level 1 cache, level 2 cache or any other data storage for creating memory registers. An embodiment may extend a memory register file from one data storage device to another or span a memory register file across multiple data storages. A compiler incorporating an embodiment may recognize and leverage the fact that different register types have different performance characteristics. For example, a memory register may be slower than a physical register. Accordingly, a compiler may compile code to give preferential treatment to using a particular type of register over another when a thread of the compiled code executes.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to explain the principles of the invention, the practical application, and to enable others of ordinary skill in the art to understand the invention for various embodiments with various modifications as are suited to the particular use contemplated.

What is claimed is:

1. A computer implemented method for register allocation in a multi-threading data processing environment, the computer implemented method comprising:
    determining that a thread of an application in the data processing environment needs a higher number of physical registers than a second number of physical registers in a set of physical registers that is available to allocate to the thread;
    configuring the thread to utilize a logical register that is mapped to a memory register, wherein a physical register is a hardware register, the memory register comprises memory space configured to operate as an additional physical register outside the set of physical registers, wherein the logical register is a data structure that the thread references in a manner the thread references a physical register in the set of physical registers, and wherein the thread performs an operation on the logical register to cause the operation on one of the physical register and the memory register; and
    executing the thread.

2. The computer implemented method of claim 1, further comprising:
    determining a need for a number of registers larger than a number of physical registers available for allocating to a plurality of threads in the data processing environment;
    allocating a space in a data storage device for use as a set of memory registers; and
    configuring the space for use as the set of memory registers.

3. The computer implemented method of claim 2, further comprising:
    determining whether the multi-threading data processing environment needs more registers than total registers existing in the set of physical registers and the set of memory registers;
    allocating, responsive to the determining the need for more registers being affirmative, a second space in a second data storage device; and
    configuring the second space for use as a second set of memory registers.

4. The computer implemented method of claim 2, wherein the configuring the space is populating an address table, the address table maintaining a set of addresses, an address in the set of addresses corresponding to a memory register in the set of memory registers.

5. The computer implemented method of claim 1, wherein the thread further utilizes a second logical register mapped to a physical register in the set of physical registers.

6. The computer implemented method of claim 1, wherein all physical registers in the set of physical registers are allocated to the thread.

7. The computer implemented method of claim 1, further comprising:
    having a second thread of the application executing in the data processing environment, the second thread having allocated thereto a subset of the set of physical registers;
    determining, responsive to determining that the thread needs the higher number of physical registers, whether the second thread is not using a subset of the subset of the set of physical registers allocated to the second thread, the subset of the subset of the set of physical registers forming transferable physical registers; and
    making, responsive to the determining that the second thread is not using the transferable physical registers being affirmative, the transferable physical registers available for use by the thread by re-allocating the transferable physical register from the second thread to the thread while the thread and the second thread are executing.

8. The computer implemented method of claim 7, wherein the making the transferable physical registers available for use by the thread is performed while the thread and the second thread are both executing.

9. The computer implemented method of claim 7, further comprising:
    allocating a second memory register; and
    assigning the second memory register to the second thread as a replacement of a transferable physical register upon re-allocating the transferable physical registers.

10. The computer implemented method of claim 1, further comprising:
    finding, responsive to determining that the thread needs the higher number of physical registers, whether a subset of the set of physical registers is unallocated; and making, responsive to the finding being affirmative, a logical register from the subset of the set of physical registers that is unallocated available for use by the thread.

11. The computer implemented method of claim 1, further comprising:
  determining that the data processing environment utilizes a set of memory registers;
  further determining that the thread will use a subset of the set of physical registers and the memory register; and
  configuring the thread such that the thread uses a physical register in the subset of physical registers preferentially over the memory register.

12. The computer implemented method of claim 1, wherein each physical register in the set of physical registers is allocated for use by the thread.

13. The computer implemented method of claim 1, wherein the memory register is configured in a level 1 cache of a processor in the data processing environment.

14. A computer usable program product comprising a computer usable storage device including computer usable code for register allocation in a multi-threading data processing environment, the computer usable code comprising:
  computer usable code for determining that a thread of an application in the data processing environment needs a higher number of physical registers than a second number of physical registers in a set of physical registers that is available to allocate to the thread;
  computer usable code for configuring the thread to utilize a logical register that is mapped to a memory register, wherein a physical register is a hardware register, the memory register comprises memory space configured to operate as an additional physical register outside the set of physical registers, wherein the logical register is a data structure that the thread references in a manner the thread references a physical register in the set of physical registers, and wherein the thread performs an operation on the logical register to cause the operation on one of the physical register and the memory register; and
  computer usable code for executing the thread.

15. The computer usable program product of claim 14, further comprising:
  computer usable code for determining a need for a number of registers larger than a number of physical registers available for allocating to a plurality of threads in the data processing environment;
  computer usable code for allocating a space in a data storage device for use as a set of memory registers; and
  computer usable code for configuring the space for use as the set of memory registers.

16. The computer usable program product of claim 14, further comprising:
  computer usable code for having a second thread of the application executing in the data processing environment, the second thread having allocated thereto a subset of the set of physical registers;
  computer usable code for determining, responsive to determining that the thread needs the higher number of physical registers, whether the second thread is not using a subset of the subset of the set of physical registers allocated to the second thread, the subset of the subset of the set of physical registers forming transferable physical registers; and
  computer usable code for making, responsive to the determining that the second thread is not using the transferable physical registers being affirmative, the transferable physical registers available for use by the thread by re-allocating the transferable physical register from the second thread to the thread.

17. The computer usable program product of claim 14, further comprising:
  computer usable code for allocating a second memory register; and
  computer usable code for assigning the second memory register to the second thread as a replacement of a transferable physical register upon re-allocating the transferable physical registers.

18. The computer usable program product of claim 14, wherein the computer usable code is stored in a computer readable storage medium in a data processing system, and wherein the computer usable code is transferred over a network from a remote data processing system.

19. The computer usable program product of claim 14, wherein the computer usable code is stored in a computer readable storage medium in a server data processing system, and wherein the computer usable code is downloaded over a network to a remote data processing system for use in a computer readable storage medium associated with the remote data processing system.

20. A data processing system for register allocation in a multi-threading data processing environment, the data processing system comprising:
  a storage device including a storage medium, wherein the storage device stores computer usable program code; and
  a processor, wherein the processor executes the computer usable program code, and wherein the computer usable program code comprises:
    computer usable code for determining that a thread of an application in the data processing environment needs a higher number of physical registers than a second number of physical registers in a set of physical registers that is available to allocate to the thread;
    computer usable code for configuring the thread to utilize a logical register that is mapped to a memory register, wherein a physical register is a hardware register, the memory register comprises memory space configured to operate as an additional physical register outside the set of physical registers, wherein the logical register is a data structure that the thread references in a manner the thread references a physical register in the set of physical registers, and wherein the thread performs an operation on the logical register to cause the operation on one of the physical register and the memory register; and
    computer usable code for executing the thread.

* * * * *